United States Patent
Hanna

[15] 3,689,527
[45] Sept. 5, 1972

[54] PROCESS FOR ESTERIFICATION OF TETRACHLOROTEREPHTHALIC ACID

[72] Inventor: Delbert L. Hanna, Oak Park, Ill.

[73] Assignee: Velsical Chemical Corporation, Chicago, Ill.

[22] Filed: Feb. 27, 1969

[21] Appl. No.: 803,072

Related U.S. Application Data

[63] Continuation-in-part of Ser. No. 477,927, Aug. 6, 1965, abandoned.

[52] U.S. Cl..........260/475 R, 260/455 R, 260/471 R
[51] Int. Cl..............................................C07c 69/82
[58] Field of Search......................................260/475

[56] References Cited

UNITED STATES PATENTS 3,341,131   8/1967   Burkhardt.................260/475

OTHER PUBLICATIONS

Meyer et al., Ber., 30, pp. 784– 785 (1897)
Werner et al., Ber. 37, pp. 3,658– 3,661 (1902)
Graebe, Ann. 340, pp. 244– 249, (1905)
Migridichian, Organic Snythesis, Vol. I, pp. 326– 327 (1957)

*Primary Examiner*—Lorraine A. Weinberger
*Assistant Examiner*—E. Jane Skelly
*Attorney*—Robert J. Schwarz

[57]           ABSTRACT

A process for the esterification of tetrachloroterephthalic acid which comprises reacting tetrachloroterephthalic acid and an alkylating agent in an aqueous medium having a pH between about 5 and about 10.

8 Claims, No Drawings

PROCESS FOR ESTERIFICATION OF TETRACHLOROTEREPHTHALIC ACID

This application is a continuation in part of my copending application Ser. No. 477,927 filed Aug. 6, 1965, now abandoned.

This invention relates to the esterification of tetrachloroterephthalic acid. In particular this invention relates to the preparation of mono- and dialkyl esters of tetrachloroterephthalic acid in commercially advantageous yields.

Terephthalic acid and its chlorinated products are available in substantial quantities and present a useful building block in the construction of a variety of chemical products. One useful area is the variety of esters of tetrachloroterephthalic acid. Since tetrachloroterephthalic acid is a dicarboxylic compound, it is of particular advantage to be able to produce high yields of its monoesters.

Difficulty is encountered in the direct esterification of tetrachloroterephthalic acid with alcohol. This difficulty is related to the presence of substituents in the positions ortho to the carboxyl group. In the case of some acids, so hindered, particularly when the substituent is an alkyl group, this difficulty can be overcome by dissolving the carboxylic acid in 100 percent sulfuric acid and pouring this solution into an alcohol. This technique fails to produce significant amounts of ester when applied to tetrachloroterephthalic acid.

Several procedures have been proposed for the production of the monoesters of tetrachloroterephthalic acid with varying success and operating difficulties.

One such procedure is by the hydrolysis of the dialkyl ester of tetrachloroterephthalic acid. This procedure is not a preferred method as the hydrolyzation requires more than mild conditions and is difficult to control to the extent required in hydrolyzation of only one of the ester groups. Furthermore, this reaction in certain instances will affect other substituents present in the diacid. Accordingly, there are drawbacks in this procedure.

Another possibility for the production of monoesters of tetrachloroterephthalic acid is by reaction of the corresponding diacid chloride and alcohol. Essentially this process has the drawbacks present in the first described method of operation, and in addition the mixture of tetrachloroterephthaloyl chloride, methyl ester of tetrachloroterephthalic acid mono chloride and dimethyltetrachloroterephthalate produced by this procedure are very difficult to separate into the individual components.

It is therefore an object of the present invention to devise a process for the preparation of esters of tetrachloroterephthalic acid.

It is another object of the present invention to devise a process for the production of monoesters of tetrachloroterephthalic acid.

It is still another object of the present invention to devise a process for the production of diesters of tetrachloroterephthalic acid.

It is still another object of the present invention to perform the esterification of tetrachloroterephthalic acid without the formation of substantial quantities of other products that cannot be reused in the process.

In essence the present process comprises the reaction of tetrachloroterephthalic acid and a suitable alkylating agent in a controlled pH aqueous medium.

The selection of the alkylating agent will depend on the specific ester to be prepared by the process. This process can be used in the preparation of various esters of tetrachloroterephthalic acid. Naturally the selection of the alkylating agent must be made in accordance with the identity of the desired product. In general the lower alkyl esters of tetrachloroterephthalic acid have created the most interest and accordingly while other esters can be prepared by this process, its use in the preparation of the lower alkyl esters is most interesting.

Thus, it is seen that while the present process contemplates the use of a variety of alkylating agents, it is best suited to the use of alkylating agents containing up to 12 carbon atoms. This process is of particular significance with alkylating agents containing up to six carbon atoms. Exemplary of alkylating agents useful in the process are the unsubstitued alkyl chlorides and alkyl sulfates containing up to 12 carbon atoms such as methyl chloride, dimethyl sulfate, ethyl chloride, diethyl sulfate, isopropyl chloride, diisopropyl sulfate, butyl chloride, dibutyl sulfate, pentyl chloride, dipentyl sulfate, nonyl chloride, dinonylsulfate, decyl chloride, diundecyl sulfate, lauryl chloride and dilauryl sulfate.

In performing the present process it is necessary that the pH of the reaction medium be maintained between about 5 and about 10. Optimum results are obtained in reaction mediums having a pH between about 7 and about 10. The use of a pH range outside of the requisite range causes inefficient use of the alkylating agent. Also, the use of this pH range maximizes the total formation of esters as compared to the use of a reaction medium outside of the 5 to 10 pH range.

The pH ranges can readily be achieved by the addition of an alkaline material to the aqueous dispersion of the tetrachloroterephthalic acid. Exemplary of materials useful for this purpose are materials which will form an alkali metal or alkaline earth metal salt of the acid in this aqueous system. Exemplary of these materials are the hydroxides and carbonates of sodium, potassium, calcium and magnesium. By use of these materials there is obtained a water solution of the respective salts of tetrachloroterephthalic acid having the requisite pH.

The pH of the solution should be maintained at the proper level during the addition of the alkylating agent. Since tetrachloroterephthalic acid is a dicarboxylic acid there is formed during the reaction mono- and diester. In the present aqueous system this presents no problem as the diester is substantially insoluble and can be removed therefrom and recovered by filtration from the reaction system.

When it is desirable to prepare maximum amounts of monoester it is preferred to control the molar ratio of esterifying agent and tetrachloroterephthalic acid to between about 0.5:1 and 1.5:1.

The various alkylating agents which can be used in the present process include alkyl sulfates and alkyl chlorides. When alkyl sulfates are used temperatures from below room temperature up to about 100° C. can be used. For most purposes temperatures from 25° C. to 40° C. are preferable. Temperatures over about 100° C. would necessitate the use of super-atmospheric pressure and would have no particular advantage. The reaction is exothermic requiring use of cooling means The addition of alkyl sulfate should be at a rate slow enough to afford adequate temperature control.

When alkyl chlorides are used as the alkylating agent the process is operable from about 70° C. to about 150° C. Superatmospheric pressures are required when the alkyl chloride contains up to four carbon atoms and in any case when the reaction temperature is above the atmospheric boiling point of the reaction mixture.

One of the features of this process is the absence in the product of undesirable by-products. The ratio of the two main products; namely, the monoalkyl ester and the dialkyl ester can be varied according to the amount of alkylating agent used. The only other major ingredient in the reaction mixture is a quantity of unalkylated tetrachloroterephthalic acid which can be separated and recycled if desired.

Normally it takes from 1 to 4 hours to obtain economic yields when alkyl sulfates are used as the alkylating agent. Ten to 20 hours are usually required when the alkyl chlorides are used.

The following examples illustrate the operation of the present process.

EXAMPLE 1

Preparation of Monomethyl Tetrachloroterephthalate

Tetrachloroterephthalic acid (20 grams; 0.066 moles) dissolved in water (50 ml.) was placed in a glass reaction flask equipped with stirrer, thermometer and heating mantle. Potassium hydroxide was added in an amount so as to neutralize the solution. Dimethyl sulfate (16.6 grams; 0.132 moles) was slowly added to the solution with continuous stirring while maintaining the temperature of the reaction mixture below 35° C. Additional potassium hydroxide was added to control the pH of the reaction mixture between 9 and 10. The solution was stirred for about 3 hours and was then heated to 70° C. for a short interval.

Then the reaction mixture was diluted with about three times its volume of water and the dimethyl tetrachloroterephthalate filtered from the solution. This product weighed 3.7 grams. The pH of this solution was lowered to 1.5 and the monomethyl tetrachloroterephthalate was recovered by filtration of the reaction mixture. This product weighed 9.6 grams.

Then the acidity of the reaction mixture was increased and the unreacted tetrachloroterephthalic acid (5.9 grams) was recovered.

EXAMPLE 2

Preparation of Monomethyl Tetrachloroterephthalate

Tetrachloroterephthalic acid (20 grams; 0.066 moles) dissolved in water (50 ml.) was placed in a glass reaction flask equipped with stirrer, thermometer and heating mantle. Potassium hydroxide was added in an amount so as to neutralize the solution. Dimethyl sulfate (16.6 grams; 0.132 moles) was slowly added to the solution with continuous stirring while maintaining the temperature of the reaction mixture below 35° C. Additional potassium hydroxide was added to raise and maintain the pH of the reaction mixture between 9 and 10. The solution was stirred for about 3 hours and was then heated to 70° C. for a short interval.

Then the reaction mixture was diluted with three times its volume of water and the dimethyl tetrachloroterephthalate filtered from the solution. This product weighed 1.6 grams. The pH of the solution was lowered to 1.5 and the monomethyl tetrachloroterephthalate was recovered by filtration of the reaction mixture. This product weighed 9.0 grams. Then the acidity of the reaction mixture was increased and the unreacted tetrachloroterephthalic acid (8.6 grams) was recovered.

EXAMPLE 3

Preparation of Monomethyl Tetrachloroterephthalate

Wet tetrachloroterephthalic acid (100 pounds) containing tetrachloroterephthalic acid (55 pounds; 0.181 moles) and water (81.25 pounds) were placed in a reaction vessel equipped with stirrer, thermometer and heating means. Potassium hydroxide (22.5 pounds of a 45 percent aqueous solution) was added making the pH of the reaction 1.8. Additional aqueous potassium hydroxide (42.5 pounds) was added making the pH of the mixture 6.25. Methyl chloride was then added at a rate of 1 pound per hour. Additional aqueous potassium hydroxide was added at a rate of 0.62 pounds per hour. The reaction was allowed to continue for 12 hours. During the reaction period the temperature of the reaction mixture was maintained at 195° F. and 75 p. s. i. g. The product analyzed as follows:

Potassium salt of tetrachloroterephthalic acid 27.4 Wt. %

Potassium salt of monomethyl tetrachloroterephthalate 55.7 Wt. %

Dimethyl tetrachloroterephthalate 15.5 Wt. %

EXAMPLE 4

Preparation of Monoethyl Tetrachloroterephthalate

Wet tetrachloroterephthalic acid (100 pounds) containing tetrachloroterephthalic acid (55 pounds; 0.181 moles) and water (81.25 pounds) are placed in a reaction vessel equipped with stirrer, thermometer and heating means. Potassium hydroxide (22.5 pounds of a 45 percent aqueous solution) is added. Additional aqueous potassium hydroxide is added to raise the pH of the mixture to about 6. Ethyl chloride is then added at a rate of 1 pound per hour. Additional aqueous potassium hydroxide is added at a rate of 0.62 pounds per hour. The reaction is allowed to continue for 12 hours. During the reaction period the temperature of the reaction mixture is maintained at 200° F. and 75 p. s. i. g. The desired potassium salt of monoethyl tetrachloroterephthalate is recovered therefrom.

EXAMPLE 5

Preparation of Monohexyl Tetrachloroterephthalate

Wet tetrachloroterephthalic acid (100 pounds) containing tetrachloroterephthalic acid (55 pounds; 0.181 moles) and water (81.25 pounds) are placed in a reaction vessel equipped with stirrer, thermometer, reflux condenser and heating means. Potassium hydroxide (22.5 pounds of a 45 percent aqueous solution) is added. Additional aqueous potassium hydroxide is added to raise the pH of the mixture to about 6. Hexyl chloride is then added at a rate of 1 pound per hour. Additional aqueous potassium hydroxide is added at a rate of 0.62 pounds per hour. The reaction is allowed to continue for 12 hours. During the reaction period the temperature of the reaction mixture is maintained at 200° F. The desired potassium salt of monohexyl tetrachloroterephthalate is recovered therefrom.

EXAMPLE 6

Preparation of Mononoyl Tetrachloroterephthalate

Wet tetrachloroterephthalic acid (100 pounds) containing tetrachloroterephthalic acid (55 pounds; 0.181 moles) and water (81.25 pounds) are placed in a reaction vessel equipped with stirrer, thermometer, reflux condenser and heating means. Potassium hydroxide (22.5 pounds of a 45 percent aqueous solution) is added. Additional aqueous potassium hydroxide is added to raise the pH of the mixture to about 6. Nonyl chloride is then added at a rate of 1 pound per hour. Additional aqueous potassium hydroxide is added at a rate of 0.62 pound per hour. The reaction is allowed to continue for 12 hours. During the reaction period the temperature of the reaction mixture is maintained at 200° F. The desired potassium salt of mononyl tetrachloroterephthalate is recovered therefrom.

EXAMPLE 7

Preparation of Monolauryl Tetrachloroterephthalate

Wet tetrachloroterephthalic acid (100 pounds) containing tetrachloroterephthalic acid (55 pounds; 0.181 moles) and water (81.25 pounds) are placed in a reaction vessel equipped with stirrer, thermometer, reflux condenser and heating means. Potassium hydroxide (22.5 pounds of a 45 percent aqueous solution) is added. Additional aqueous potassium hydroxide is added to raise the pH of the mixture to about 6. Lauryl chloride is then added at a rate of 1 pound per hour. Additional aqueous potassium hydroxide is added at a rate of 0.62 pound per hour The reaction is allowed to continue for 12 hours. During the reaction period the temperature of the reaction mixture is maintained at 200° F. The desired potassium salt of monolauryl tetrachloroterephthalate is recovered therefrom.

Depending on the ultimate use for the products of this process, it can be desirable to isolate the monoester of tetrachloroterephthalic acid from the diester and free acid starting material present in the product. In other instances the product can be used without further purification.

In those situations where it is desirable to have a pure monoalkyl tetrachloroterephthalate this can be accomplished by a variety of means of varying efficiency. One procedure is as follows:

The product containing monoalkyl tetrachloroterephthalate, tetrachloroterephthalic acid, and dialkyl tetrachloroterephthalate is added to a solution of potassium hydroxide and filtered. This separates the dialkyl tetrachloroterephthalate. Hydrochloric acid is then added to the potassium hydroxide extract, precipitating the mixture of acids. Chloroform is then added in a quantity of from 50 to 100 cc per 10 grams of acids. The chloroform extract can then be filtered and evaporated to give the monoalkyl tetrachloroterephthalate.

Other procedures for the isolation of the monoesters can be employed as desired.

As previously indicated the monoesters are particularly valuable as chemical intermediates. The sterically hindered carboxylate group will undergo certain reactions. One principal use of it is to prepare the acid chloride, a highly reactive material capable of undergoing substantial reactions.

The acid chloride of a monoalkyl ester of tetrachloroterephthalic acid can be prepared by dissolving the acid in a suitable solvent, such as benzene, and adding excess thionyl chloride on a molar basis thereto. This reaction proceeds quantitatively. The following example illustrates its preparation:

EXAMPLE 8

Preparation of the Acid Chloride of Monomethyl Tetrachloroterephthalate

Monomethyl tetrachloroterephthalate (10 grams; 0.031 mol.) was placed in a 200 cc. round bottom glass reactor flask equipped with heating mantle and reflux condenser. Thionyl chloride (33.8 grams; 0.285 mol.) was added to the reaction flask. The temperature of the reaction mixture was raised to reflux and maintained at gentle reflux for 1 hour. The excess thionyl chloride was evaporated off leaving product (10.5 grams) containing monomethyl tetrachloroterephthaloyl chloride (63 weight percent).

EXAMPLE 9

Preparation of the Amide of Monomethyl Tetrachloroterephthalate

Concentrated ammonium hydroxide (500 cc) is placed in a 1 liter round bottom glass reaction flask equipped with thermometer, stirrer, addition funnel, reflux condenser and cooling means. The acid chloride of monomethyl tetrachloroterephthalic acid (50 grams; 0.18 mol.) is dissolved in dioxane (120 cc) and this solution is added to the reaction flask over a 15-minute period while maintaining rapid stirring and holding the reaction temperature at room temperature. After the addition of the acid chloride dioxane solution is complete, the reaction mixture is allowed to stand for 1 hour. The solids are filtered off, washed with water and dried. The amide of monomethyl tetrachloroterephthalate (40 grams) and having a melting point of 203°–205° C. is obtained.

This acid chloride can be reacted to prepare several useful compounds. Some of the reactions of the acid chloride of monomethyl tetrachloroterephthalate and the products thereof are as follows:

EXAMPLE 10

Preparation of the N-n-Decyl Amide of Monomethyl Tetrachloroterephthalate

The acid chloride of monomethyl tetrachloroterephthalate (336.5 grams; 0.9 mole) and benzene (500 ml.) are placed in a 2-liter three-necked round bottom flask fitted with a mechanical stirrer, reflux condenser, internal thermometer and dropping funnel. N-Decylamine, (157 grams; 1 mol.) in pyridine (79 grams; 1 mol) is added dropwise with stirring over a 1 hour period of time. The reaction mixture is stirred for 16 hours at room temperature. The reaction mixture is then poured into water (6,000 cc.) with vigorous stirring. The benzene layer is separated and dried over magnesium sulfate. The benzene layer is filtered to remove magnesium sulfate and the benzene removed under reduced pressure giving the desired N-n-decyl amide of monomethyl tetrachloroterephthalate.

The reaction illustrated in Example 10 can also be performed with other amines. In doing so the N- decylamine would be replaced by a suitable amine namely, one having amide substituents corresponding to the desired amide substituents of the product. Included in these amines would be the unsubstituted lower alkyl amines particularly methyl and ethylamine. The procedure of reacting the acid chloride with the amine would be conducted as set forth in Example 10 by direct addition of the acid chloride in the amine in the presence of solvent such as benzene. The reaction time will vary with the identity of the amine and the reaction temperature employed. As noted in the Example, room temperature is useful although higher temperatures can permit shorter reaction times. Recovery of the amide product can be carried out by removal of the benzene solvent after completion of the reaction.

Still another use for the monoalkyl esters of tetrachloroterephthalate is set forth in the following example It can be seen from this example that it provides an efficient procedure for preparing a mixed ester of tetrachloroterephthalic acid.

EXAMPLE 11

Preparation of O,S-Dimethyl Tetrachlorothioterephthalate

The acid chloride of monomethyl tetrachloroterephthalate (20.2 grams; 0.060 mols.) and toluene (39.3 grams) are placed in a glass round bottom flask equipped with thermometer, stirrer, cooling means and condenser. A solution of potassium methyl mercaptide (5.3 grams; 0.062 mols.) in methanol (10.4 grams; 0.32 mol.) is added over a two-hour reaction time with continuous stirring and with the temperature maintained between 20 and 30° C. A heating mantle is then substituted for the cooling means and the toluene and methanol are distilled off. Water (65 grams) is then added and the remainder of the toluene and methanol were removed by steam distillation. Water is added continuously to maintain a constant volume. The product was then filtered off, washed with water, and dried under vacuum. O,S-Dimethyl tetrachlorothioterephthalate is obtained.

I claim:

1. A process for the preparation of monomethyl tetrachloroterephthalate which comprises reacting tetrachloroterephthalic acid and an alkylating agent selected from the group consisting of unsubstituted alkyl chlorides containing up to 12 carbon atoms and unsubstituted alkyl sulfates containing up to 12 carbon atoms in an aqueous medium having a pH between about 5 and about 10.

2. The process of claim 1 wherein the pH is maintained by adding an alkaline material selected from the group consisting of hydroxides and carbonates of sodium, potassium, calcium and magnesium.

3. The process of claim 1 wherein the alkylating agent is dimethyl sulfate.

4. The process of claim 1 wherein the alkylating agent is methyl chloride.

5. The process of claim 3 wherein the molar ratio of tetrachloroterephthalic acid and dimethyl sulfate is between about 0.5:1 and 1.5:1.

6. The process of claim 4 wherein the molar ratio of tetrachloroterephthalic acid and methyl chloride is between 0.5:1 to 1.5:1.

7. The process of claim 3 wherein the pH range is maintained by adding potassium hydroxide thereto.

8. The process of claim 4 wherein the pH range is maintained by adding potassium hydroxide thereto.

* * * * *